United States Patent [19]
Roseto

[11] Patent Number: 4,561,533
[45] Date of Patent: Dec. 31, 1985

[54] CHATTER FREE ROTARY FRICTION DEVICE AND METHOD OF MAKING THE SAME

[76] Inventor: Frank N. Roseto, 2 Knoll La., Jericho, N.Y. 11753

[21] Appl. No.: 529,588

[22] Filed: Sep. 6, 1983

[51] Int. Cl.⁴ .................. F16D 13/60; F16D 11/00
[52] U.S. Cl. .................. 192/107 M; 188/218 A
[58] Field of Search .............. 188/218 A, 218 XL; 192/70.13, 70.14, 70.15, 107 M, 107 T, 107 C, 107 R

[56] References Cited

U.S. PATENT DOCUMENTS

| | | | |
|---|---|---|---|
| 1,656,778 | 1/1928 | Desroziers | 192/107 R |
| 3,180,470 | 4/1965 | Binder | 192/107 M |
| 3,329,245 | 7/1967 | Freber | 188/218 A X |
| 3,520,389 | 7/1970 | Smales | 192/107 C |
| 3,526,307 | 9/1970 | Falzone | 192/107 C |
| 3,610,383 | 10/1971 | Roseto | 188/218 A X |
| 4,202,432 | 5/1980 | Komori | 192/107 M |

Primary Examiner—William E. Tapolcai
Attorney, Agent, or Firm—Bauer & Amer

[57] ABSTRACT

A rotary friction device having at least a plate supporting a friction element for frictional engagement between relatively rotatable members. When in frictional engagement the plate is placed in tension to tend to stretch the expanse of the same to prevent the application of compressive forces thereon or flexure thereof so as to avoid the production of chattering and related problems by the same.

10 Claims, 5 Drawing Figures

U.S. Patent  Dec. 31, 1985  4,561,533
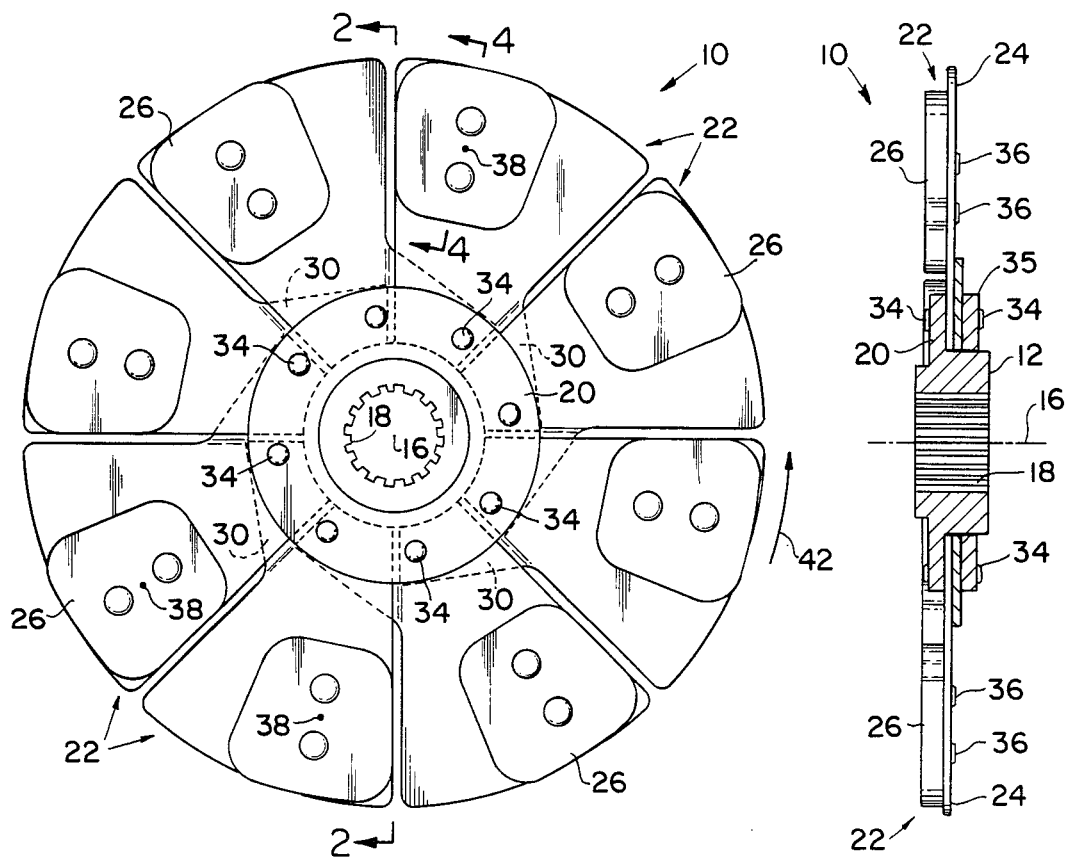
FIG.1
FIG.2
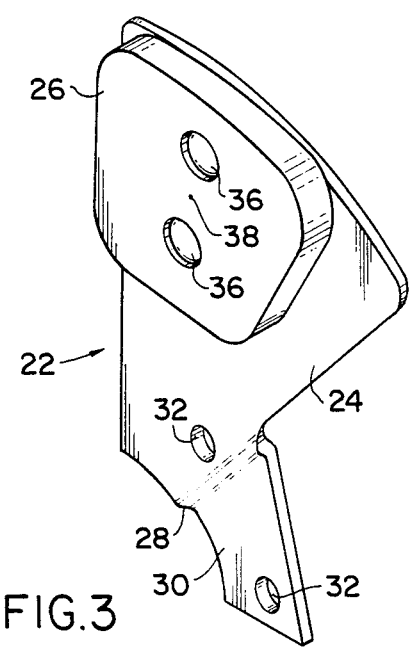
FIG.3
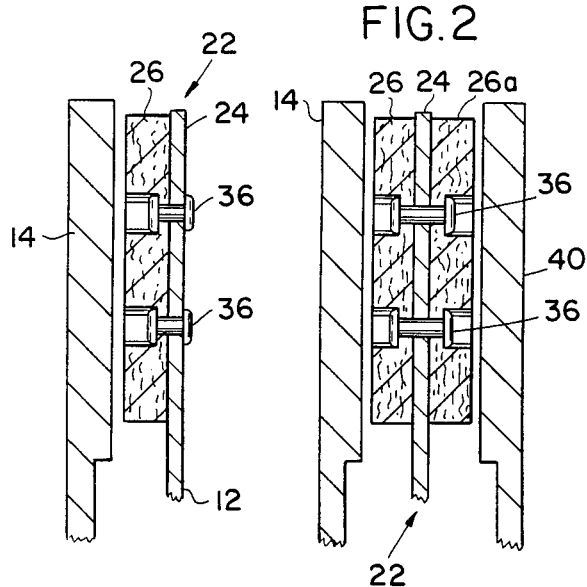
FIG.4
FIG.5

CHATTER FREE ROTARY FRICTION DEVICE AND METHOD OF MAKING THE SAME

BACKGROUND OF THE INVENTION

The present invention relates to a rotary friction device of the type disclosed in my U.S. Pat. No. 3,610,383 of Oct. 5, 1971, and to a method of making the same.

More particularly, the present invention is an improvement upon the aforementioned rotary friction construction of my aforementioned patent.

In rotary friction devices having segmented frictional mounting plates of the type disclosed in my aforementioned patent, each mounting plate functions independently of the other thereby to frictionally engage between relatively rotatable members. Such a segmented type frictional construction offers many advantages over prior art constructions of the non-segmented types because each mounting plate operates independently of the other to conform to and to provide a more precise and better frictional engagement between two relatively rotating members.

Although such segmented friction constructions are effective, the chattering noises they produce are distracting. They are also susceptible of hard grabbing engagement between the clutching surfaces. The mere fact that the chattering noises are sometimes produced is a factor that militates against the greater acceptance and wider usage of such constructions.

The present invention overcomes the problems of the prior art by teaching a construction and method of making the mounting plates and mounting them on at least one of the relatively rotatable members so as to obviate and avoid the production of chattering, clutch grabbing and other friction engaging problems.

It has been found that clutch or brake chatter and related problems are produced when the member supporting the friction element is engaged between two relatively rotating braking or clutching members and is placed under compression or permitted to flex during the clutching or braking operation. The segmented rotary friction device of the present invention lends itself to curing this problem.

Thus, a feature and object of the present invention is to provide a mounting plate that supports a friction element for engagement between two relatively rotatable members accurately in advance of the means employed to mount the plate to one of such members so that the friction element moves in the direction of arcuate movement of the relatively rotatable members to effect a pulling, stretching or tensioning force on the mounting means. The effective result is that the mounting plate or plates are placed in tension between the friction element and the means mounting the plate or plates to their relatively rotatable member. This causes the engaged plate to expand and to prevent its accidental flexure that produces the chattering noises.

The above description, as well as further objects, features and advantages of the present invention, will be more fully appreciated by reference to the following detailed description of a presently preferred, but nonetheless illustrative, embodiment in accordance with the present invention when taken in conjunction with the accompanying drawing wherein:

BRIEF DESCRIPTION OF THE DRAWING

FIG. 1 is a front elevation of a rotary friction device constructed according to the teaching of the invention;

FIG. 2 is a cross-section of FIG. 1 taken along and in the direction of lines 2—2 thereof;

FIG. 3 is a perspective view of one of the mounting members;

FIG. 4 is a cross-sectional view of FIG. 1 taken along lines 4—4; and

FIG. 5 is a cross-sectional view similar to FIG. 4 showing the device used as a clutch.

SUMMARY OF THE INVENTION

Referring now to the drawing, the friction device that is shown is generally identified by the numeral 10 and approximates closely the illustration of the invention of my aforementioned patent. The device 10 is shown in FIG. 4 with two relatively rotatable engageable members 12 and 14, each of which has an effective axis of rotation 16 as can be seen in FIGS. 1 and 2. The one engaging member 12 may be of a hub having a plurality of axially disposed teeth or spines 18 that may be mounted on and engaged with a drive shaft (not shown) of any desired mechanism with which the present invention is to be used. For example, the hub 12 may be mounted at the spline 18 to a clutch drive shaft or to a brake axle. The end use to which the present invention is put is not intended to constitute a limitation upon the scope of its protection.

Secured perpendicularly to a radially extending flange 20 forming a part of the hub 12 are a plurality of mounting members generally identified by the numeral 22. The mounting member 22 is shown in greater detail in FIG. 3. It may be made of any desired material capable of withstanding high heats and preferably being able of dissipating such heats rapidly. Each mounting member 22 is exactly the same in detail; hence, a description of one will suffice for all of them.

The mounting member 22 is formed of a substantially flat plate shaped element 24 that supports or mounts an engaging friction element 26. Inasmuch as the mounting members 22 are positioned side by side in circular alignment about the hub engaging member 12 and its flange 20, they form a radial continuation thereof. Each mounting member 22 is relatively smaller in its arcuate extent or size in its location closer to the hub 12 and increases progressively arcuately in size as it extends further away from its securement with the hub flange 20. Hence, each plate element 24 tapers radially outward to a larger size than it is at its radial inner portion.

To enable the plates 24 to be circumferentially aligned when they are secured to the hub flange 20, they are provided with an axially directed step 28 as can be seen more clearly in FIG. 3. This results in the formation of a substantially flat arcuate ear-shaped extension 30. From the drawing it will be seen that the depth or offset of the step 28 is of such an amount as to accommodate the thickness of the next adjacent plate of the next adjacent mounting member 22. The step or axially directed offset 28 enables the ear of one mounting member 22 to be overlapped by the lower end of the plate of the next adjacent mounting member 22. This enables all mounting members 22 to be aligned circumferentially about the hub when secured to the flange 20 thereof.

The mounting members 22 are secured to the flange 20 of the hub engaging member 12 at a plurality of holes or openings 32 previously provided therein, one of which is positioned radially inward near to and in the vicinity of the lower corner of the plate 24. Another securing hole or opening 32 is positioned in the ear extension at a point that is remote from the friction element 26. In fact, both securing holes or openings 32 are positioned as remote from the friction element 26 as is possible for a reason that will be made clear as the description proceeds.

Suitable securing means of any desired construction may be used to secure the plate 24 of the mounting member 22 to the flange 20 of the hub engaging member 12. Such securing means may be in the form of rivets, screws or the like. They are depicted in FIG. 1 and are identified by the numeral 34. The washer 35 serves as a backing and support for the plates 24 of the mounted members 22.

The friction producing engaging element 26 that is mounted on each plate 24 of the mounting member 22 is positioned thereon in a preselected cooperating relationship with the location of the securing means 34 of each respective mounting member 22. It is noted that the friction element 26 is mounted on the plate 24 by any convenient means. In the drawing the mounting means is shown in the form of rivets 36; however, any other form of securing means may be utilized. In practice, however, the securing means may be other than the rivets 36. In fact, the friction elements 26 may be mounted on their respective plates 24 in the same manner as was described and taught in my aforementioned patent.

It will suffice to note that the approximate center 38 of the mass of the friction element 26 is located on its respective mounting member 22 spaced radially outward from its nearest respective connections 34 to the plate 24 of the hub engaging member 12. The approximate center of mass 38 of the friction elements 26 is also positioned arcuately forward or in advance of the nearest connections 34 in the direction of rotation of the relatively rotating members 12 and 14.

This means, that by reason of the segmented construction afforded by the members 22, each friction element 26 is capable of independent frictional engagement with the other relatively rotating engaging member 14 to adjust to the configuration and irregularities or imperfections thereof. In the event the present invention is used in a clutch or a brake construction or a similar construction in which the engaging member 14 may be a flywheel or a vehicle wheel or the like, it may be assumed that the same is rotating counterclockwise relative to the member 12 or in the direction as shown by the arrow 42 as is seen in FIG. 1. When frictional engagement is established between the member 14 and the friction elements 26 by relative axial movement of the relatively rotating members 12 and 14 toward each other, the momentum of the relatively rotating member 14 is transmitted to the engaging elements 26 to apply to them a pulling force that stretches the plate 24 in the direction of the arrow 42 and places the same under tension.

However, the inertia or resistance to rotation applied to the plates 24 at their secure connections 34 to the hub 12 (that may be slower moving or even stationary), places the full expanse of the frictionally engaged plates 24 in tension causing the same to stretch between their respective connections 34 and their respective engaged friction elements 26. The stretching by tensioning of the plates 24 prevents the plates from flexing or shortening compressively. By avoiding and obviating the application of any compressive forces applied to the plates 24 during the frictional engagement between the relatively rotating members 12 and 14, the production of chattering and related problems is prevented and obviated.

Thus, it has been found that by selectively locating the approximate center of mass 38 of each friction element 26 radially outward and arcuately forward or ahead of the connections 34 of their respective mounting member 22 with the hub 12, a long lever arm is effected through the expanse of the plate 24. By assuring that the lever arm or expanse of the plate 24 which forms such lever arm does not have the opportunity to compress, flex or bend during the frictional engagement between the two relatively movable members 12 and 14, the production of chattering noises and related problems is avoided.

It is desirable to increase the lever arm between the approximate center 38 of mass of the friction elements 26 and its respective connections 34 in the direction of the relative rotation of the two relatively movable engaging members 12 and 14 during the engagements therebetween. By so locating the connections 34 radially inward and in a manner that the same arcuately trail the approximate center 38 of the mass of the friction elements 26, it is assured that during all such frictional engagements between the relatively moving members 12 and 14, the plates 24 will be placed under stress by applying a pulling force upon the same that causes the plates to stretch and be placed under tension. This prevents their flexing and compression which produces the chattering noises and related problems.

By being able to increase the lever arm it is possible to obtain a mechanical advantage. Although the lever arm is increased there is no corresponding increase in the overall diameter size of the friction device or the engaging surfaces of the members 22. This enables the device 10 to be made relatively small in size while being more effective in resisting relative rotation by more rapidly absorbing such forces that are applied to them. Thus, where a shaft (not shown) is connected with the hub 12 must be brought into synchronous rotation with a flywheel 14 of an engine, the longer lever arms of the plates 24 will absorb such forces over their greater lengths to permit the relatively moving shaft and flywheel 14 to achieve synchronous rotation more rapidly.

Hence, what has been provided is a chatter free rotary friction device utilizing a plurality of substantially planar mounting plate-like members. By placing the same under stress during their frictional engagement with a relatively rotating member so as to tension the mounting member and related plate the application of compressive forces thereon that tend to flex or bend the same and produce the chattering and related noises is avoided as are the resultant problems.

The embodiment shown in FIG. 5 depicts a clutching device 10 as previously described having a backing pressure plate 40 that is generally stationary. The plate 40 provided a rigid backing support during the engagement of the friction elements 26 with the flywheel 14. To effect a better clutching action the members 22 have friction elements 26 supported on opposite sides thereof in the manner previously described, for engagement with the pressure plate 14.

While there have been shown and described and pointed out the fundamental novel features of the invention as applied to a preferred embodiment thereof, it will be understood that various omissions and substitutions and changes in the form and details of the device illustrated and in its operation may be made by those skilled in the art without departing from the spirit of the invention. It is the intention, therefore, to be limited only as indicated by the scope of the claims appended hereto.

What is claimed is:

1. A rotary friction device having a plurality of relatively rotating members each with an axis of rotation passing therethrough, a plurality of plates each connected to one of said members in a plane substantially perpendicular to said axis of rotation and being circumferentially spaced thereabout, friction means mounted on each said plate for frictional engagement with at least another of said members to restrain relative rotation between said members, and a plurality of means connecting each said plate to said one member each at a point arcuately rearward of the mount of said friction means to said respective plate such that when said friction means is engaged with another relatively rotating member moving in a rotational direction about said axis of rotation said plate is placed in tension between said friction means and said connecting means and to avoid production of chattering.

2. A rotary friction device as in claim 1, each of said plates mounting said friction means separately to one of said members for independent frictional engagement with another of said members to tension each of said plates independently of the others of said plates in response to frictional engagement between its respective friction means and said other member.

3. A rotary friction device as in claim 1, said connecting means connecting each said plate to said one friction member being radially inward of the mounting of said friction means to its respective plate.

4. A rotary friction device as in claim 1, said mounting of said friction means to its respective plate being arcuately forward of said means connecting each said plate to said one member.

5. A rotary friction device as in claim 1, said connecting means connecting each said plate to said one member being radially inward of the mounting of said friction means to its respective plate and said mounting of said friction means to its respective plate being arcuately forward of said means connecting each said plate to said one member.

6. In a device for use between relatively rotatable engageable members in which one of said engaging members is a hub, at least a plate connected with said hub and having mounting friction means thereon spaced radially outward from the center of said hub and spaced radially outward from and arcuately forward of the whole of the connection of said plate with said hub in the direction of relative rotation of said hub and another engaging member whereby frictional engagement that is effected between said plate friction means and other engaging member is in advance of forces applied to the connecting means between said plate and hub such that said plate therebetween is stretched and placed in tension in the direction of rotation to avoid the application of compressive forces thereon that produce chattering.

7. In a device as in claim 6, a plurality of said plates being mounted circumferentially about said hub to provide a plurality of friction means each spaced arcuately about and radially outward from said hub.

8. In a device as in claim 7, each of said plates being connected with said hub by relatively spaced connecting means each of which is spaced radially inward of and arcuately trailing the mounting of said friction means on the respective plate.

9. The method of making a rotary friction device chatter free comprising connecting a radially extending plate on one of two relatively rotatable engaging members by means to securely position a friction element mounted on the plate radially outward of a hub of the one engaging member, and positioning the whole of the connection to arcuately trail the approximate center of the mass of the friction element to cause a pulling force to be applied to the plate to tense the plate when frictional engagement is established between the friction element of the one engaging member and the engaging friction element to prevent the flexure of the plate and avoid the chattering.

10. The method of making a rotary friction drive as in claim 9, securing a plurality of like radially extending plates circumferentially about the hub of the one engaging member to provide a plurality of friction elements each positioned arcuately in advance of the trailing mounting means of its respective plate.

* * * * *